(12) United States Patent
Ainger (10) Patent No.: US 11,280,691 B2
(45) Date of Patent: Mar. 22, 2022

(54) OPTICAL FIBRE PRESSURE SENSING APPARATUS EMPLOYING LONGITUDINAL DIAPHRAGM

(71) Applicant: Nuron Limited, London (GB)

(72) Inventor: Michael Ainger, London (GB)

(73) Assignee: Nuron Limited, London (GB)

( * ) Notice: Subject to any disclaimer, the term of this patent is extended or adjusted under 35 U.S.C. 154(b) by 362 days.

(21) Appl. No.: 16/495,602

(22) PCT Filed: Mar. 20, 2018

(86) PCT No.: PCT/EP2018/057051
§ 371 (c)(1),
(2) Date: Sep. 19, 2019

(87) PCT Pub. No.: WO2018/172370
PCT Pub. Date: Sep. 27, 2018

(65) Prior Publication Data
US 2020/0088597 A1 Mar. 19, 2020

(30) Foreign Application Priority Data

Mar. 21, 2017 (GB) ...................................... 1704492

(51) Int. Cl.
*G01L 7/08* (2006.01)
*G01L 9/00* (2006.01)
(Continued)

(52) U.S. Cl.
CPC ............. *G01L 7/086* (2013.01); *G01H 9/004* (2013.01); *G01L 7/08* (2013.01); *G01L 9/0064* (2013.01); *G01L 11/025* (2013.01); *G01L 23/16* (2013.01)

(58) Field of Classification Search
CPC .......... G01H 11/02; G01H 17/00; G01H 3/00; G01H 3/005; G01H 3/125; G01H 9/008;
(Continued)

(56) References Cited

U.S. PATENT DOCUMENTS 4,408,829 A 10/1983 Fitzgerald et al.
4,751,690 A 6/1988 Krueger
(Continued)

FOREIGN PATENT DOCUMENTS

CN 1309764 A 8/2001
CN 1395680 A 2/2003
(Continued)

OTHER PUBLICATIONS

Office Action for Chinese Patent Application No. CN 201880019650. 7, dated Dec. 3, 2020.
(Continued)

*Primary Examiner* — Andre J Allen
(74) *Attorney, Agent, or Firm* — Andrus Intellectual Property Law, LLP (57) ABSTRACT

An apparatus for producing strain in an optical fibre proportional to dynamic pressure fluctuation in the surrounding substance. The apparatus includes a diaphragm having a first face that, in use, is exposed to dynamic pressure fluctuations in the substance, and a second, opposite face, the diaphragm being adapted to flex in response to dynamic pressure fluctuations applied to it. One or more optical fibres are mounted on either the first or the second face of the diaphragm, whereby strain is produced in the fibre when the diaphragm flexes.

20 Claims, 11 Drawing Sheets t = thickness
w = width
L = length

1 = diaphragm
2 = fibre
3 = substrate (51) Int. Cl.
  *G01L 23/16* (2006.01)
  *G01H 9/00* (2006.01)
  *G01L 11/02* (2006.01)

(58) Field of Classification Search
  CPC .......... G01H 1/12; G01H 11/00; G01H 13/00;
       G01H 3/12; G01H 9/006; G01H 3/10
  USPC .................................................. 73/700–756
  See application file for complete search history.

(56) References Cited

U.S. PATENT DOCUMENTS

| | | | | |
|---|---|---|---|---|
| 5,604,318 | A | * | 2/1997 | Fasshauer ............... G08B 13/10 |
| | | | | 250/227.16 |
| 5,936,235 | A | | 8/1999 | Minamitani et al. |
| 7,656,535 | B2 | * | 2/2010 | Healey ............... G01D 5/35303 |
| | | | | 356/477 |
| 9,528,893 | B2 | * | 12/2016 | Wang ....................... G02B 6/30 |

FOREIGN PATENT DOCUMENTS

| | | | |
|---|---|---|---|
| CN | 101233400 | * | 7/2008 |
| CN | 201348549 Y | | 11/2009 |
| CN | 102639965 A | | 8/2012 |
| EP | 3086103 | | 10/2016 |
| GB | 2586974 | * | 9/2019 |
| JP | S63144226 | | 6/1988 |
| JP | H09229807 | | 9/1997 |
| JP | 2000221085 | | 8/2000 |
| JP | 2002098604 | | 4/2002 |
| JP | 2002116094 | | 4/2002 |
| JP | 4570222 B2 | | 10/2010 |
| WO | 2015169217 A1 | | 11/2015 |

OTHER PUBLICATIONS

Combined Search and Examination Report for GB1704492.6, dated Apr. 28, 2017.
International Search Report for PCT/EP2018/057051, dated Jun. 5, 2018.

* cited by examiner

OPTICAL FIBRE PRESSURE SENSING APPARATUS EMPLOYING LONGITUDINAL DIAPHRAGM

CROSS-REFERENCE TO RELATED APPLICATIONS

This application is the U.S. national stage application of International Application PCT/EP2018/057051, filed Mar. 20, 2018, which international application was published on Sep. 27, 2018, as international Publication WO2018/172370 in the English language. The international application is incorporated herein by reference, in entirety. The international application claims priority to GB Patent Application No. 1704492.6, filed Mar. 21, 2017, which is incorporated herein by reference, in entirety.

TECHNICAL FIELD

The present invention relates generally to monitoring and measurement of dynamic pressures in solid, liquid and gaseous substances, and particularly to the manner in which an optical fibre is mechanically interfaced to such substances.

BACKGROUND

Research in the 1970s, including that by Dr Kingsley (references 1 and 2), demonstrated that light passing through optical fibres experiences phase change in proportion to the strain experienced by the fibre, and this in turn (reference 3), could be used for strain and pressure sensing.

By the mid-1980s (reference 4), the use of reflected 'backscatter' from non-uniformities within the fibre, a technique known as reflectometry, to measure the phase change had been documented, a technique which has since been the subject of much further work and exploitation.

The objective of most liquid and gas dynamic pressure measurement systems is to measure naturally occurring hydro-acoustic and acoustic signals. Dynamic pressure fluctuations prevalent in nature in air are generally no higher than 0.5 Pa (around 88 dB SPL, beyond which point discomfort or damage to most animal hearing systems occurs), and can be as low as 20 µPa (0 dB SPL) and still be detectable by natural means.

The relationship between pressure applied to an (uncoated) optical fibre and uniform pressure applied to it is only of the order of 14 picostrains per Pascal of fluid or gas pressure, (14pε/Pa). Given that commercial reflectometric measuring instruments available to date exhibit sensitivities generally no better than 20 nC, mechanical advantage of around 15,000× (or 42 dB) is required to enable the transduction of a dynamic pressure signal of 0.1 Pa to a detectable level of strain in the optical fibre.

Techniques to achieve this have mainly fallen into two categories:

The first has been the use of a circular mandrel, around which multiple turns of fibre are wrapped, described in Reference 5. This technique has been the most widely adopted for both static and dynamic sensing, as it combines: mechanical advantage (radial to circumferential), material advantage (the volume of easily compressible soft material dominates over the volume of hard fibre), and interaction advantage (the ability to expose many turns, hence a long length, of fibre to pressure field of a smaller longitudinal profile).

The second, also described in Reference 5, has been the use of specially designed fibre coatings, which provide material advantage, but without mechanical or interaction length advantages. The efficiency advantages of using an optical fibre that is straight, as opposed to coiled, has led to much research in this second area. By optimising the stiffness of a coating bonded to the fibre, advantage can be achieved as a coating that is more compressible than the fibre and will form a composite that will exhibit strain under any given pressure greater than the bare fibre alone. Unfortunately, this effect is limited by a number of factors, including an asymptotic limit on the size of coating that can be used and the opposing forces due to adjacent section material resistance inherent in a contiguously coated fibre. Hence, the degree of advantage that can be gained by coatings has generally been limited.

It would be highly desirable to create a mechanical solution that combines: mechanical and material advantage of a similar order to mandrel based solutions with the simplicity of a straight longitudinal fibre.

The interaction length is the length over which each spatial point of the optical measurement is calculated. It is usually the effective spatial resolution of the measurement.

One of the main impediments to this has been the non-uniform strain/frequency characteristic that straight fibre exhibits under pressure fluctuations with wavelengths of less than twice the interaction length. This problem, originally described in Reference 6 and more recently confirmed in section 4.4 of reference 7, is successfully mitigated in mandrel type transducers by concentrating many coils, i.e. a long length, of fibre into a profile less than half the acoustic wavelength. However, it remains a significant drawback for 'straight fibre' (i.e. uncoiled), transducers.

SUMMARY OF THE INVENTION

In general terms, embodiments of the invention proposed herein combine a diaphragm, with an optimally bonded optical fibre to efficiently transduce fluid (i.e. liquid or gas) or solid pressure stimuli, with a novel approach to overcome the non-uniform response of the fibre to short wavelength fluctuations in the fluid pressure.

The invention exploits differentials in efficiency of strain transfer between positive (tensile) half cycles and negative (compressive) half cycles when an optical fibre is bonded to one or more dissimilar materials.

In one aspect, the invention provides an apparatus for producing strain in an optical fibre proportional to dynamic pressure fluctuation in the surrounding substance, the apparatus comprising:

a diaphragm having a first face that, in use, is exposed to dynamic pressure fluctuations in the substance, and a second, opposite face, the diaphragm being adapted to flex in response to dynamic pressure fluctuations applied to it; and one or more optical fibres mounted on either said first or said second face of the diaphragm, whereby strain is produced in the fibre when the diaphragm flexes.

In some embodiments the length of the diaphragm is at least $1 \times 10^2$ times the width of the diaphragm and the optical fibre or optical fibres extend longitudinally along the diaphragm.

In some embodiments the length of the diaphragm is at least $10^3$ times the thickness of the diaphragm and the optical fibre or optical fibres extend longitudinally along the diaphragm.

In some embodiments the thickness of the diaphragm is no more than ½ the width of the diaphragm.

In some embodiments the flexure of the diaphragm is oscillatory, the period of the oscillations being dependent on the frequency of the dynamic pressure fluctuation.

In some embodiments the thickness, width and Young's modulus of the diaphragm are selected to maximise flexural displacement of the diaphragm for a given dynamic pressure measurand.

In some embodiments the thickness and Young's modulus of the diaphragm are selected to maximise longitudinal strain of the second face of the diaphragm.

In some embodiments the thickness of the diaphragm is in the range 0.5-50 mm, more preferably in the range 0.5-4 mm.

In some embodiments the width of the diaphragm is in the range 5-250 mm, more preferably in the range 5-100 mm.

In some embodiments the Young's Modulus of the diaphragm is in the range 0.1-2 GPa.

In some embodiments the or each optical fibre is mounted on the first or second face of the diaphragm by a fixture structure that is configured to result in more strain produced in the optical fibre(s) when the diaphragm flexes towards the fibre(s) compared to the strain produced in the optical fibre(s) when the diaphragm flexes away from the optical fibre(s). In this context, a reference to flexing away from the fibre is when the face of the diaphragm to which the fibre is fixed is concave and flexing towards is when this face is convex.

The fixture structure may, for example, comprise an elastic adhesive, having a Young's modulus lower than that of the diaphragm, arranged to bond the optical fibre to the first or second face of the diaphragm, such that when the diaphragm flexes away from the optical fibre the elasticity of the adhesive allows the second face of the diaphragm to move away from the optical fibre. In this example the Young's Modulus of the elastic adhesive is preferably between 0.05 MPa and 10 MPa.

In another example the fixture structure may comprise an adhesive and/or coating around the optical fibre, between the fibre and the diaphragm, the adhesive and/or coating having a lower Young's modulus than the diaphragm, such that when the diaphragm flexes away from the fibre the fibre can deform within the adhesive and/or coating rather than be compressed. In this case, the Young's modulus of the adhesive and/or coating is preferably between 0.05 MPa and 10 MPa.

In some embodiments the apparatus may further comprise longitudinal reinforcement, in the form of fibres or a tape, disposed at the sides of the optical fibre and/or on the opposite side to the optical fibre to the diaphragm.

In some embodiments the apparatus may further comprise a direct, adhesive free interface between the optical fibre and the second face of the diaphragm, with one or more of the following characteristics to increase the coefficient of friction between the optical fibre and the second face of the diaphragm:
high friction materials and/or:
coatings with high friction coefficients, and/or:
abrasions in the second face of the diaphragm, the depth of the abrasions being having a height no more than 10% of the expected diaphragm displacement.

In this case the diaphragm face with which the optical fibre is in contact preferably has a maximum roughness of 0.5 nm.

In another aspect, the invention provides a method for producing strain in an optical fibre responsive to dynamic pressure fluctuation in a substance by using an apparatus in which the optical fibre is mounted on a diaphragm and the diaphragm oscillates in response to dynamic pressure fluctuations in the substance, the optical fibre being mounted on the diaphragm such that as the diaphragm oscillates the strain in the fibre during one half cycle of the oscillation is higher than the strain in the fibre during the other half cycle of the oscillation.

In some embodiments, during said one half cycle of the oscillation the diaphragm acts to place the optical fibre under tension and in said other half cycle the optical fibre can move relative to the diaphragm so as not to be compressed.

In this aspect the substance may be a fluid or a solid.

In this aspect, the apparatus may be an apparatus according to the first aspect above.

DETAILED DESCRIPTION

The invention will now be further described with reference to the following non-limiting Figures and Examples. Other embodiments of the invention will occur to those skilled in the art in the light of these. In particular, the invention is exemplified below with reference to measuring dynamic pressure in a fluid (i.e. liquid or gas) but the principles are equally applicable to measuring dynamic pressure fluctuations in solid substances.

Embodiments of the present invention generally concern the use of a longitudinal diaphragm, being a thin (typically 1-20 mm) plate whose width is narrow (typically 5 mm-100 mm) but whose length can be very large (perhaps many kilometres), for the transduction of dynamic pressure fluctuations to changes in strain in an optical fibre, bonded to the face (usually the face opposite the one to which the dynamic pressure is applied) of this diaphragm.

A supporting substrate of material that compresses readily may optionally be situated below the diaphragm, or the substrate may be replaced with air or a gas that compresses readily, or with liquid or gel that displaces readily.

Figure 1:
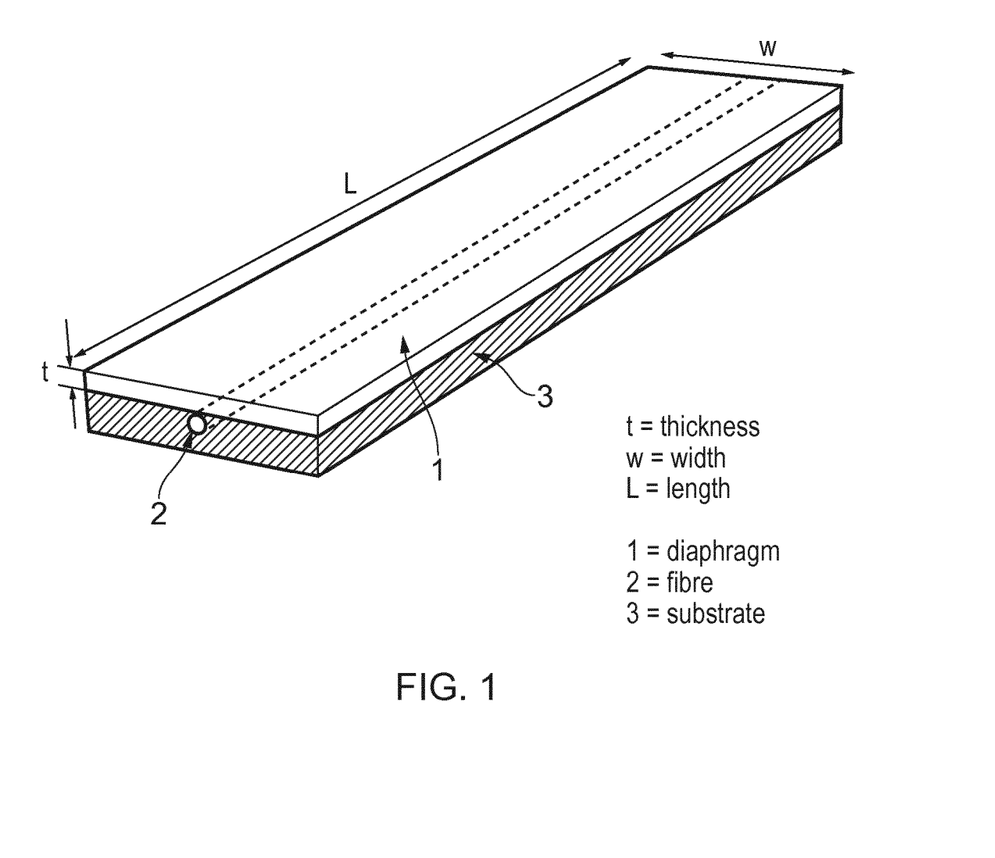
FIG. 1 shows the general arrangement of a longitudinal diaphragm with a single sensing fibre and substrate in accordance with an embodiment of the present invention.

FIG. 1 illustrates this general arrangement. As can be seen in this figure an optical fibre 2 (in some embodiments more than one fibre may be used) is bonded to the underside of a diaphragm 1. A supporting substrate 3 underlies the diaphragm 1 and surrounds the fibre 2.

In one example, the longitudinal diaphragm, designed to transduce the parameters of traveling fluid waveforms incident upon it, with dynamic pressure fluctuations of 5 Pa-500 Pa and wavelengths of 20 mm-200 mm. Typical transduction performance of such a device is 30 nε/Pa of longitudinal strain with reference to 5 m of optical fibre.

A number of novel techniques may be employed in bonding of the optical fibre to the diaphragm in order to maximise the differential in strain transfer performance between positive and negative half-cycles of dynamic strain and hence maximise the extent of mitigation of the wavelength dependant non-uniform sensitivity originally described in reference 6. Examples of such techniques are:
  High elasticity adhesive;
  Differential directional elasticity using reinforcement in the bonding mechanism; and
  Optimisation of bond thickness by reference to the displacement of the diaphragm.

Figure 9:
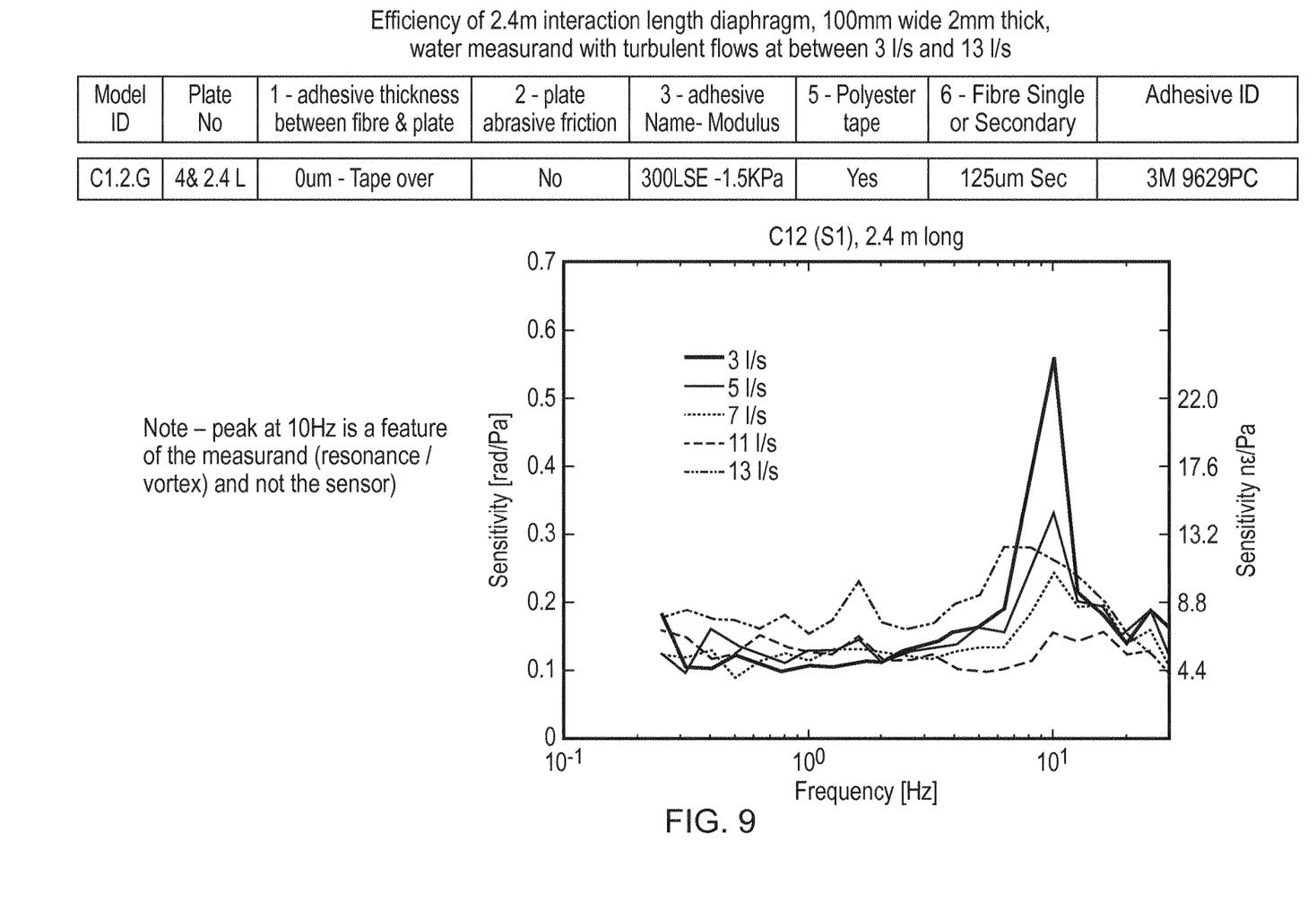
FIG. 9 shows the frequency dependence of sensitivity for an example length of diaphragm sensor.

Some embodiments of the invention create strain in the optical fibre(s) proportional to dynamic pressure fluctuations with typical sensitivity of 5-20 nC/Pa with reference to 1 m of optical fibre (in the case of a diaphragm of 100 mm width and 2 mm thickness, formed from a material of Young's Modulus 1 GPa) at a wavelength of 100 mm. This has been demonstrated in laboratory tests, typical results being shown in FIG. 9.

Advantageously, the efficiency of the pressure/strain relationship increases as a square of decreasing wavelength of the measurand, meaning that, as is generally the case with an elastic substrate, where displacement decreases as a square of increasing frequency of oscillation of the measurand, a flat net frequency response is possible.

Figure 2:
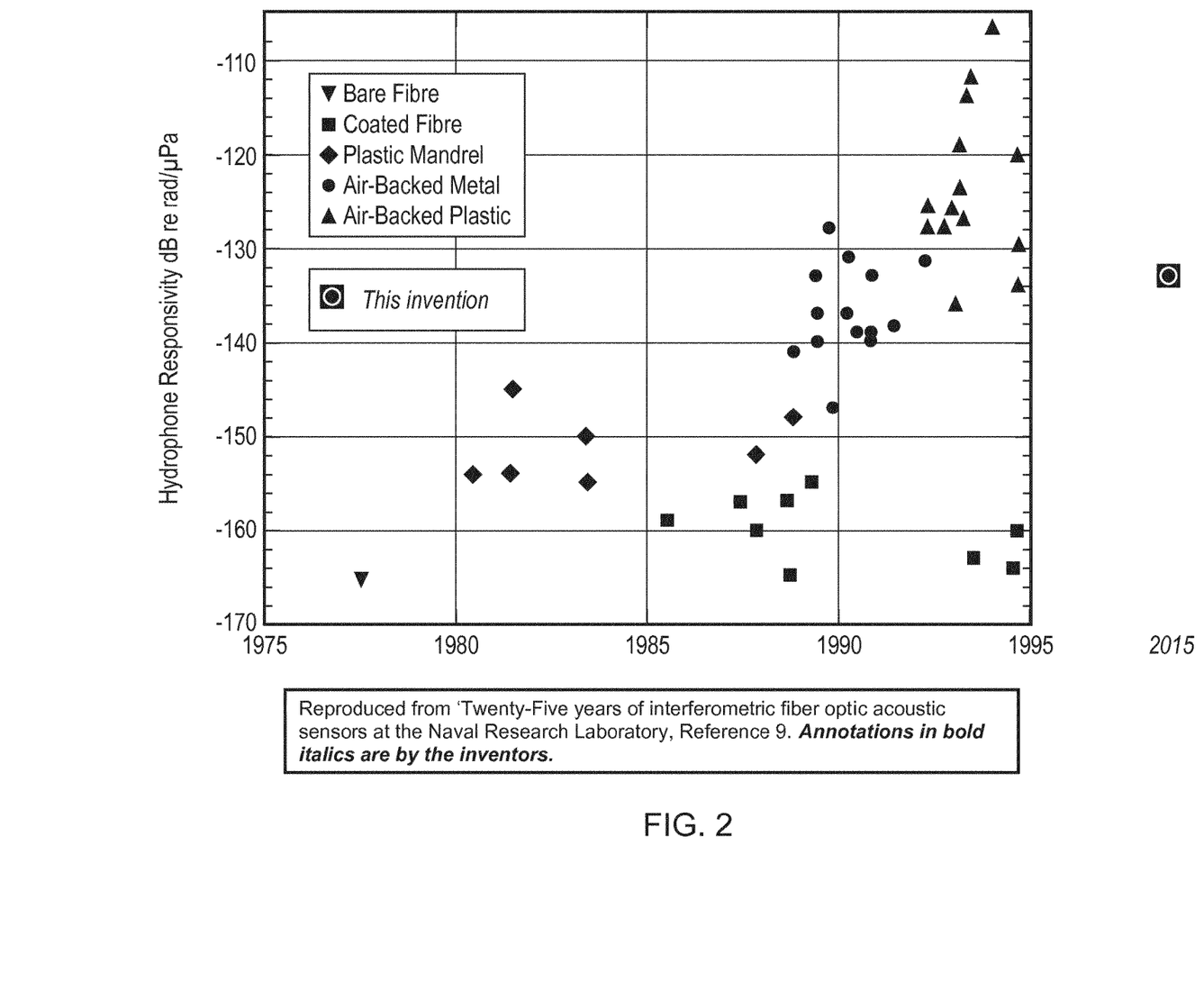
FIG. 2 shows the performance of an embodiment of the present invention in comparison with prior devices.

FIG. 2 depicts the sensitivity of the invention (based on the experimental results set out in FIG. 9) in comparison to earlier generations of sensor. It can be seen that the sensitivity is comparable to air backed plastic mandrels (but at much lower cost and complexity), and significantly superior to that of coated fibres (but without the non-uniform wavelength dependant sensitivity associated with this later class of sensor).

Mode of Operation

When a pressure wave (such as a sound wave) is incident on a surface (e.g. a flat surface or a curved surface, whether smooth or rough), the sum of the incident and reflected wave gives rise to pressure oscillations at any given point on that surface.

Similarly, when a traveling pressure wave is present in a gas or fluid which is incident on a flat surface, this pressure wave will also give rise to a similar oscillating pressure field at that surface.

If such a surface is to some extent free to displace in response to this oscillating pressure field, these displacements may be used as a means of measuring the parameters of the stimulating pressure waves.

Embodiments of the present invention concern the use of a linear plate, being long relative to its width. Example ratios of length to width are: a 2 m diaphragm 100 mm wide i.e. a ratio of 20:1, a 100 m diaphragm 20 mm wide i.e. a ratio of 5000:1, practical incarnations of the invention will generally have ratios above 10:1. In such a linear plate, flexural waves in the longitudinal direction may be observed in the presence of stimulating pressure waves. We describe this device as a 'longitudinal diaphragm'.

To the face of this longitudinal diaphragm, typically at or close to a longitudinal axis along the mid-line (i.e. located half way across the width of the diaphragm), is attached an optical fibre (or two or more optical fibres in some embodiments), in a manner described below, so that the optical fibre(s) experience a proportion of the strain manifest on the face of the longitudinal diaphragm during flexure.

Figure 3:
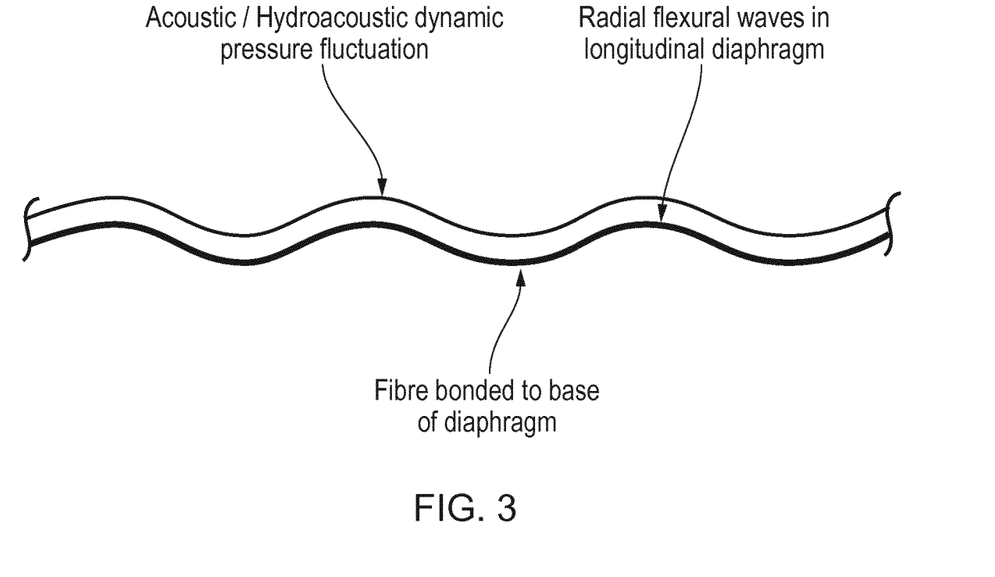
FIG. 3 shows the diaphragm of FIG. 1 in flexural oscillation as a result of applied dynamic pressure fluctuation.

FIG. 3. depicts, schematically, the flexure of the diaphragm, and hence of the fibre bonded to it, resulting from acoustic pressure fluctuations acting on the diaphragm.

Design Parameters for Diaphragm

The design parameters of longitudinal diaphragms in accordance with embodiments of the present invention may be selected to maximise displacement of the diaphragm, taking account of the amplitude, frequency and period of its oscillation when subjected to a given dynamic pressure measurand. The design parameters may include one or more of thickness, width and Young's Modulus of the material from which the diaphragm is formed. In particular, the thickness and Young's Modulus of the material from which the diaphragm is formed are preferably selected to maximise longitudinal strain on the face of the diaphragm, taking account of the amplitude and period of its oscillation when subjected to the dynamic pressure measurand.

In some embodiments of the invention, the dimensions and materials of the diaphragm may be modified to enable measurement of a wide range of acoustic and hydroacoustic measurands using an equally wide range of optical interrogation technologies to measure strain in the sensing fibre.

Figure 4A:
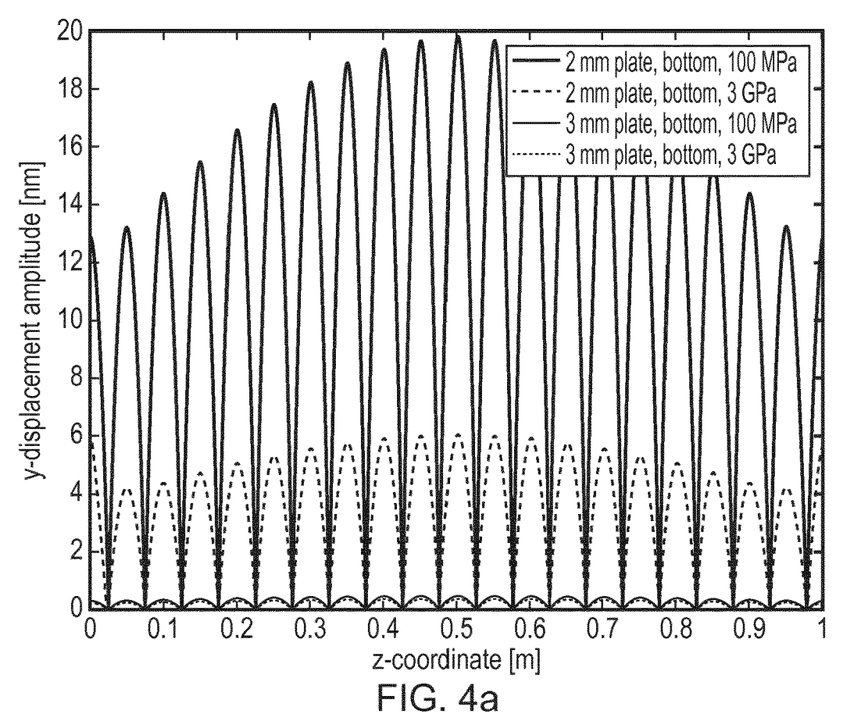
FIG. 4 shows an example Finite Element Model output for the displacement of a 110 mm width diaphragm made of various materials and of various thicknesses under applied dynamic pressure fluctuation.

As will be clear to those skilled in the art, quantification of displacement amplitude may be obtained by using commercial Finite Element Modelling (FEM) software. An example of the results of using such software to model displacement of a set of diaphragms with properties:
  width=110 mm (a size suitable for installation in large pipes, alongside roadways or runways)
  Young's modulus of 100 MPa and 3 GPa (a range of materials ranging from very low density polythene to high density polythene)
  Diaphragm thickness of 2 mm and 3 mm (a thickness chosen to optimise displacement and strain in embodiments with soft foam substrates of between 3-10 mm thickness, see below)
are shown in FIG. 4.a The peak strain that is experienced at the upper and lower faces of the diaphragm can be estimated from the displacement to be:

$$\max\{\varepsilon_{zz}\} = \Delta(\pi/d)^2 h/2$$

Figure 5:
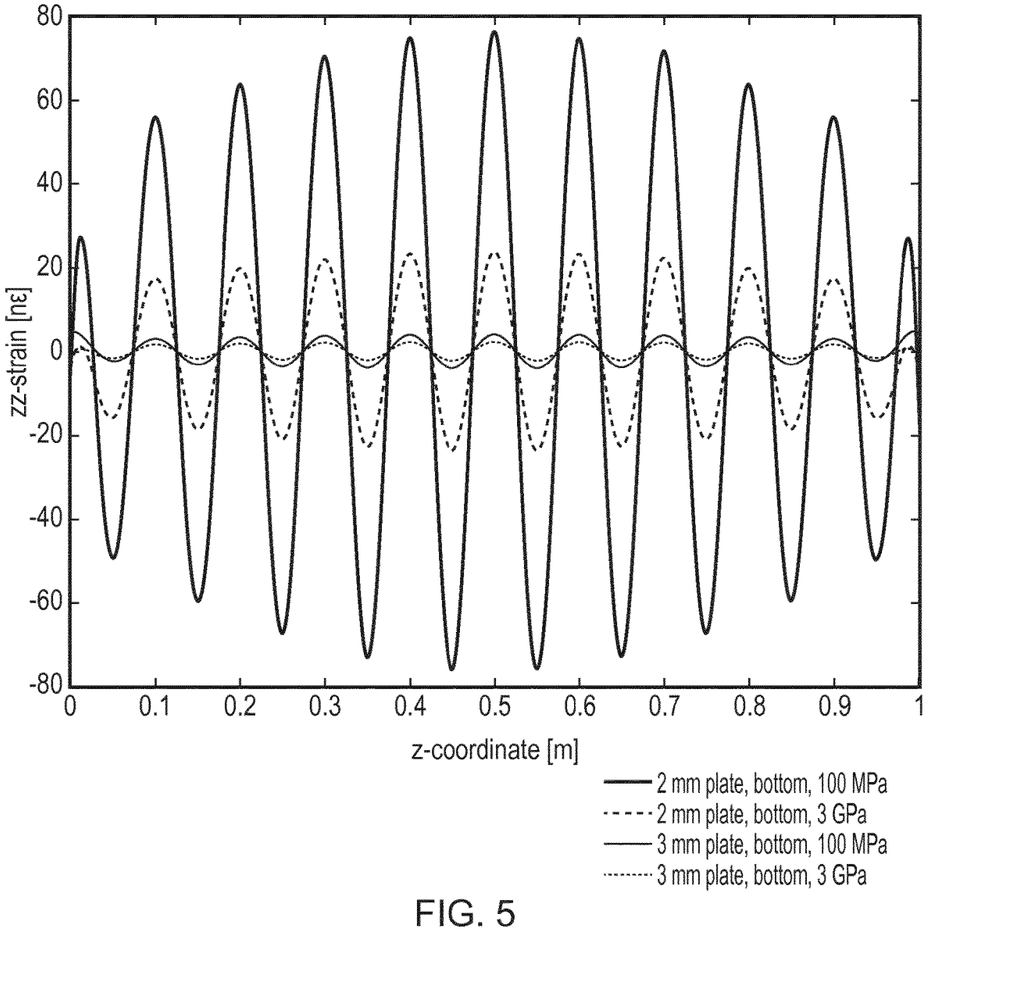
FIG. 5 shows an example Finite Element Model output for strain on the face of the diaphragms from FIG. 4.

In this equation 1:
  $\varepsilon_{zz}$ is the longitudinal strain at the face of the plate
  $\Delta$ is the amplitude of the peak displacement of the diaphragm
  h is the thickness of the diaphragm
  d is the wavelength of the oscillation As will be clear to those skilled in the art, more accurate quantification of strain on the face of the diaphragm may be obtained by using commercial Finite Element Modelling (FEM) software. An example of the results of using such software to model displacement of a set of diaphragms with the same properties as above, are shown in FIG. 5. The process of selecting the materials and dimensions for the longitudinal diaphragm necessitates a trade-off between the increasing displacement which can be achieved for any given pressure as the diaphragm is made thinner, and the increasing strain on the surface (as can be seen from equation 1 above) which can be achieved as the diaphragm is made thicker.

Figure 4B:
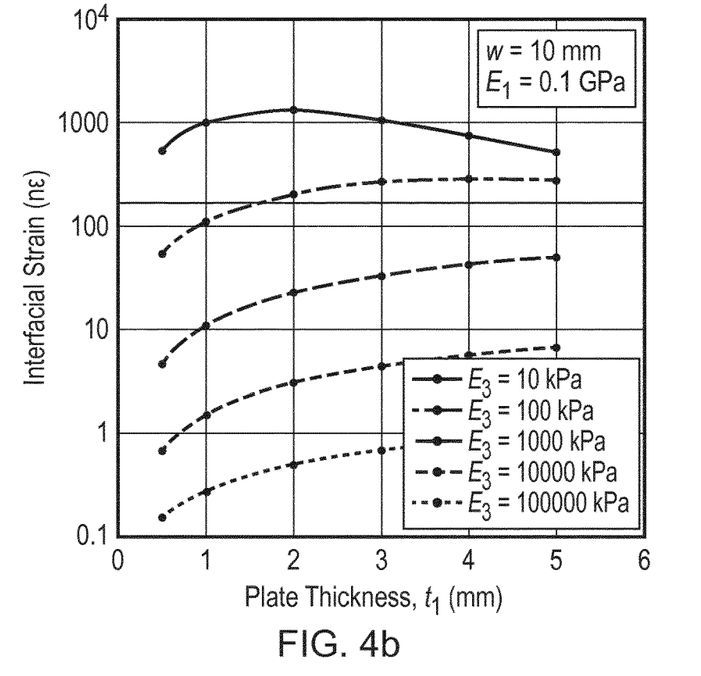

FIG. 4b is the result of modelling this for the following range of parameters:

w, the width of the plate (i.e the longitudinal diaphragm) =10 mm

E1, the Young's Modulus of the plate=0.1 Gpa

The depth of the substrate=7 mm

E3, the Young's Modulus of the substrate is varied from 500 kPa to 1 MPa t, the thickness of the diaphragm, is varied from 0.5 to 5 mm Whilst it will usually be possible to maximise both displacement and strain on the diaphragm face in order to maximise the sensitivity of the device for a required application, a number of constraints typically have to be taken into account, including:

The rigidity of the diaphragm must be kept sufficiently high in comparison to the rigidity of the optical fibre to maintain the efficiency of strain transfer between the face of the diaphragm (via the adhesive and coating) to the optical fibre. In other words, the tendency for the fibre to strain under load must be greater than the tendency of the diaphragm to deform. In practice this indicates against using diaphragm materials with E<100 MPa.

The Young's modulus and thickness of the diaphragm must be selected with regard to the environment into which the device is to be installed, as an important function of the diaphragm is to protect the optical fibre from the surrounding environment.

All dimensions will often be constrained by the available space for installation of the device.

Addressing Non-Uniform Interaction Length Effects

Those familiar with the prior art of optical sensing will know that if it were possible to bond the optical fibre to the face of the diaphragm in such a way as to maximise transfer of all strain from the face of the diaphragm to the optical fibre, then the device would exhibit a non-uniform sensitivity, which would vary with the number of half wavelengths of oscillation in any defined strain measuring length (described as the 'interaction length').

Figure 6:
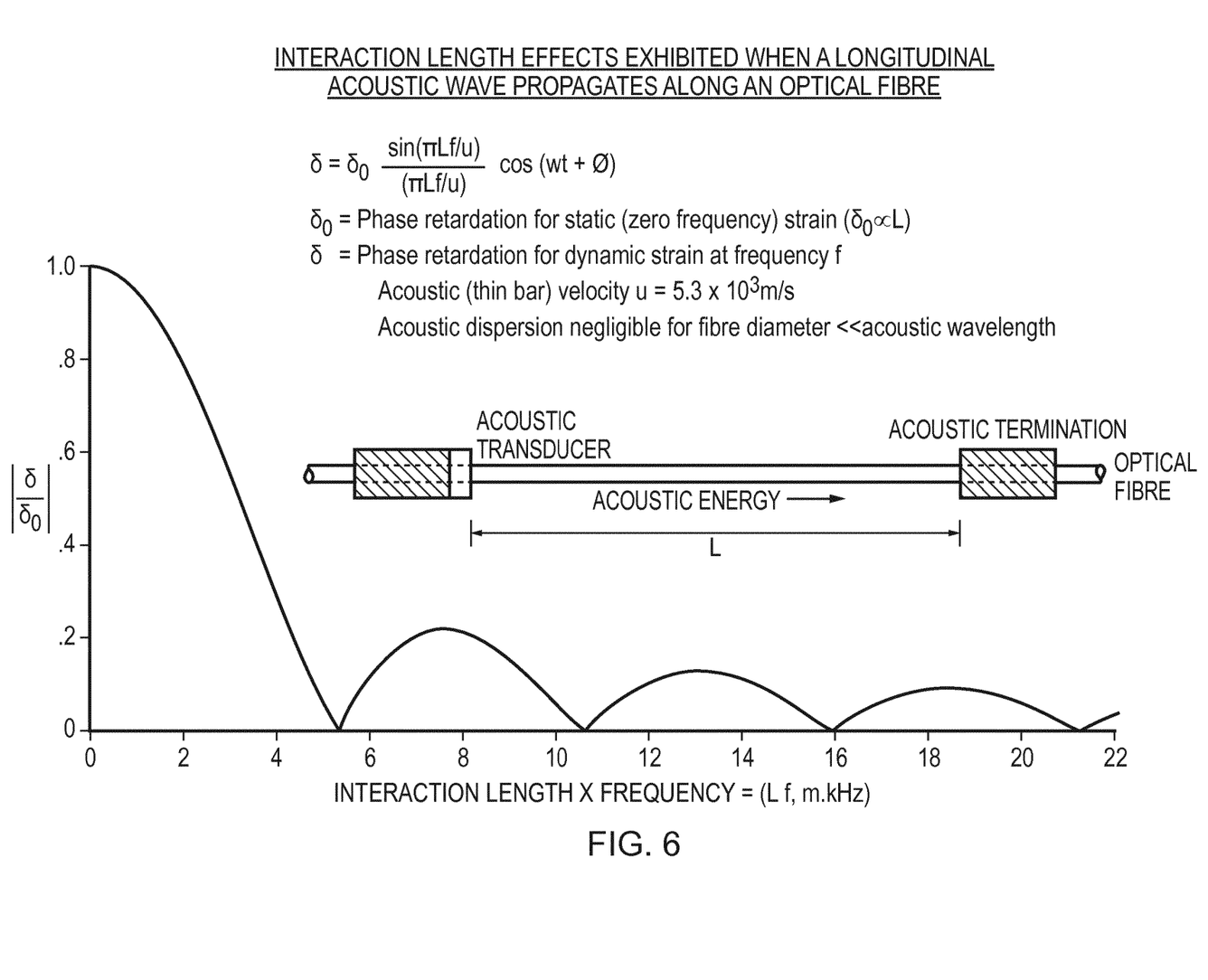
FIG. 6 shows the non-uniform interaction length effects that would occur if the strain on the face of the diaphragm were to be transferred to the optical fibre with equal efficiency in both halves of each cycle.

This non-uniformity would be of the form set out in FIG. 6.

There are major limitations of using straight optical fibres under dynamic strain due to this effect:

In most cases, non-linearity will give rise to a significantly non-uniform frequency response over a given measuring band. At worst, there may be complete 'null' responses at certain wavelengths.

As the number of half wavelengths in the interaction length increases, the sensitivity decreases, as equal positive and negative half cycles of oscillation cancel out, and only the remaining part half cycle is effective in producing net longitudinal strain.

To mitigate these effects without use of this invention, very short interaction lengths of the optical measurement are required, which creates significant challenges for most optical interrogator technologies.

This problem has been overcome in embodiments of the present invention by the adoption of coupling mechanics between the face of the diaphragm and the optical fibre with significantly different strain transfer efficiencies between the two half cycles of operation. This approach is illustrated in FIG. 7.

Figure 7:
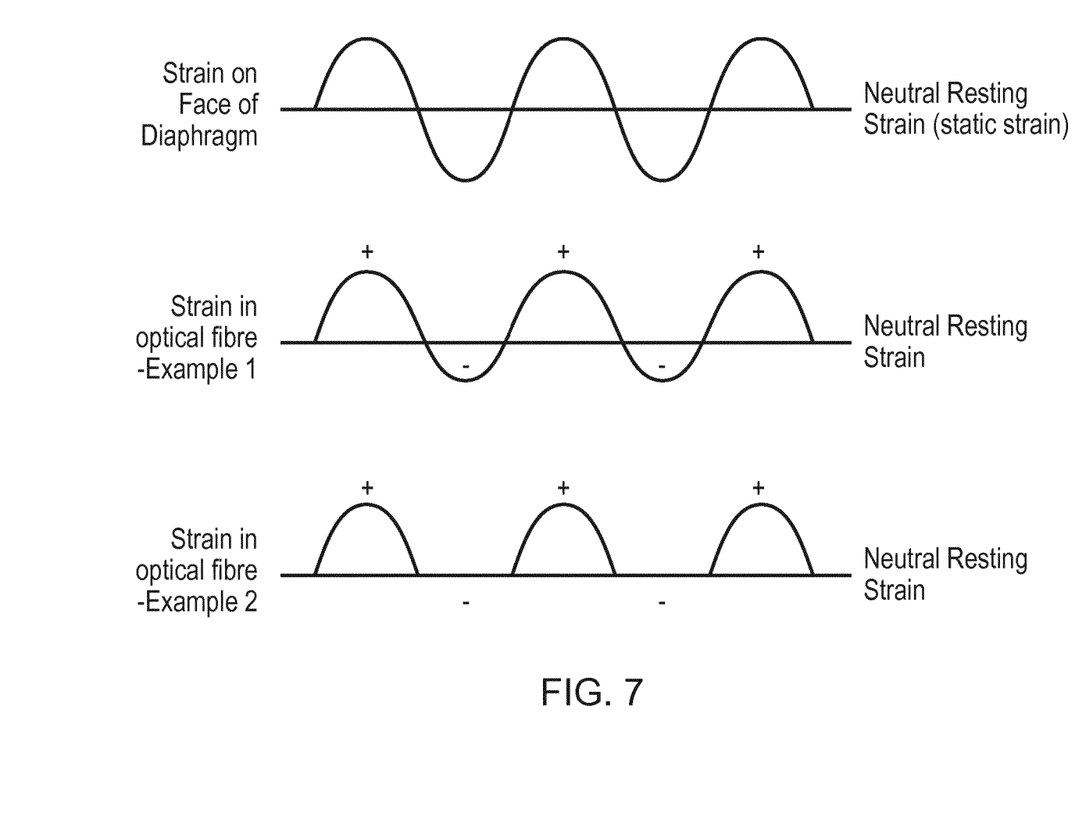
FIG. 7 shows the general principals used in the invention to reduce these non-uniform interaction length effects, using two examples.
Figure 8:
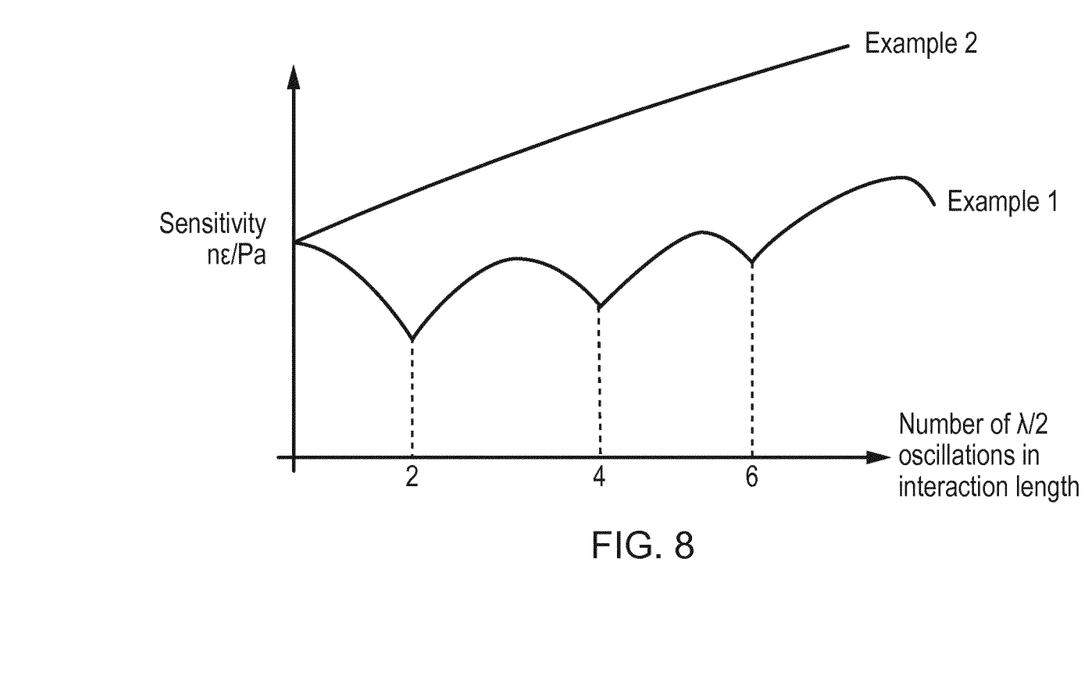
FIG. 8 shows the resulting uniformity and sensitivity benefits to be gained in the examples shown in FIG. 7.

In example 1 illustrated in FIG. 7, the strain transfer efficiency in the negative half cycles (as compared to the static strain position) is approximately 50%. In example 2, the strain transfer efficiency in the negative half cycles (as compared to the neutral or static strain position) is zero, i.e. there is no strain transfer.

Figure 10:
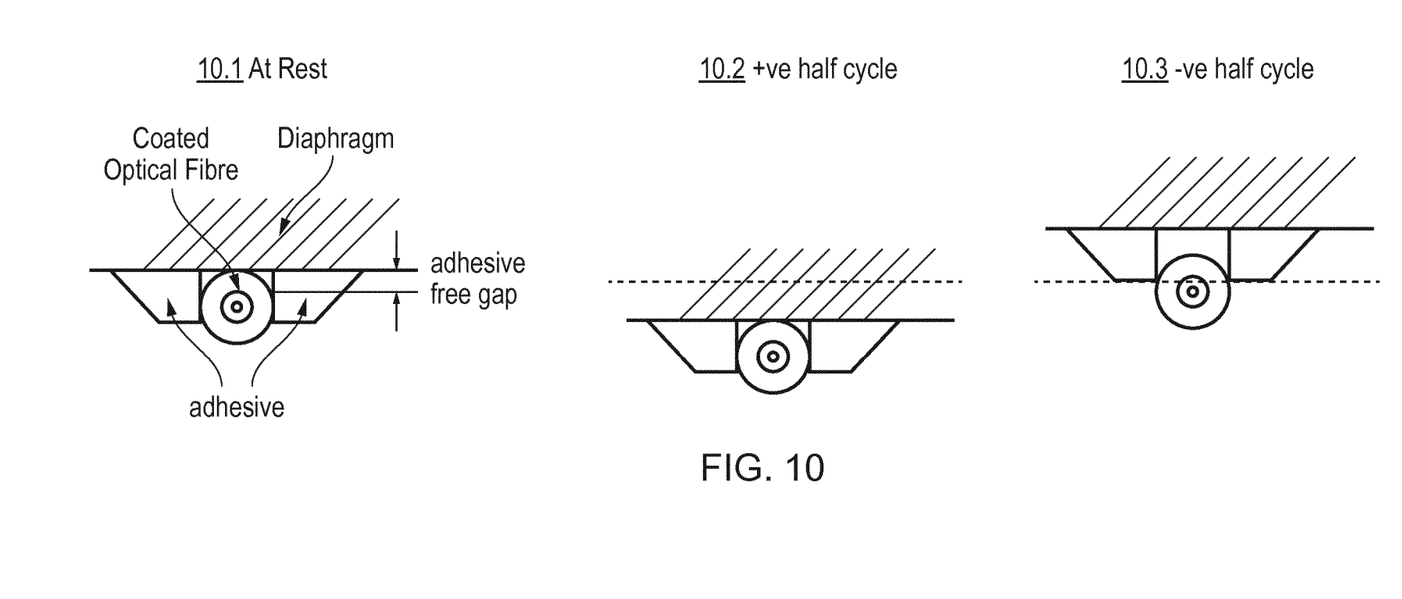
FIG. 10 shows an arrangement of adhesive and coating which can be used to give effect to these principles.

One approach proposed for embodiments of the invention to achieve this strain transfer performance (with less strain being transferred in one half of the cycle than the other half) is to utilise the elastic characteristic of the adhesive which secures the fibre to the diaphragm. A typical arrangement, illustrated in FIG. 10, utilises:

either a very thin adhesive layer, or no adhesive at the interface between the coated optical fibre and the diaphragm;

adhesive between the sides of the coated optical fibre and the diaphragm.

the adhesive being selected to have a Young's modulus significantly lower than the diaphragm (e.g. for a diaphragm of 1 GPa, the adhesive preferably has a Young's modulus between 10 MPa and 100 MPa. Similar ratios will be effective for diaphragms of other Young's moduli.

the distance between the first point of adhesion to the fibre and the diaphragm is such that at maximum displacement of the diaphragm, the elastic limit of the adhesive is not exceeded. So for a diaphragm with maximum displacement of 10 um, and an adhesive with an elastic limit of 200%, this gap would be a minimum of 5 um. The typical outside diameter of a coated optical fibre is 100 um-250 um.

With such an arrangement, during the half cycle of the diaphragm's oscillation in which the diaphragm moves towards the coated optical fibre, the optical fibre is both radially deflected from its neutral position by the pressure exerted by the diaphragm, and strained by the combined forces of friction at the interface and the shear force from the adhesive. This results in efficient transfer of strain.

During the half cycle of the diaphragm's oscillation in which the diaphragm moves away from the coated optical fibre, the optical fibre (due to its high Young's modulus of 72 GPa) will be minimally displaced from its resting position, the elastic character of the adhesive allowing the fibre to move away from the diaphragm. Friction is not engaged and shear forces are diminished by the increasing dimension of adhesive. This results in highly inefficient transfer of strain.

This arrangement is particularly advantageous in that it can be employed where static strain is either applied to the fibre in the form of 'pre-tension', or where static stain is experienced by the fibre in situ. This has many advantages, not least in reducing the extent of temperature coefficient management needed for successful operation.

As an alternative to the above configuration, the fibre can be installed without any pre-tension in the resting position. Care must also be taken to ensure that the fibre is not placed under static strain whilst in situ, for example due to temperature induced static strain.

Figure 11:
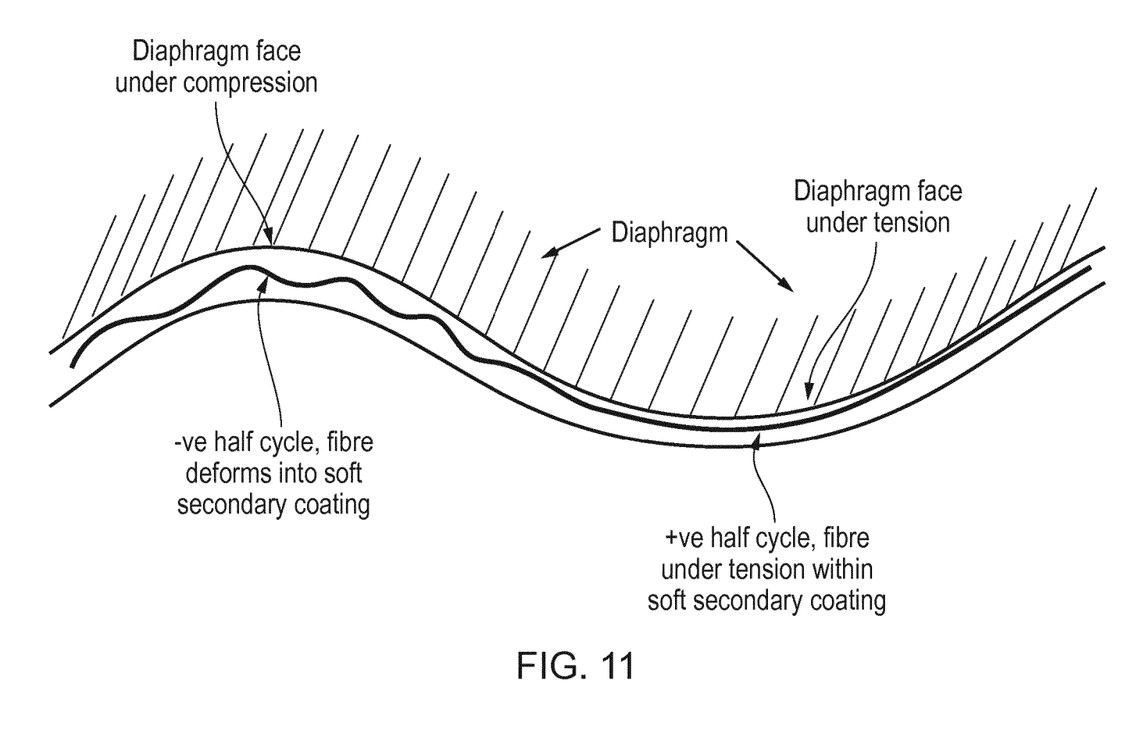
FIG. 11 shows an alternative arrangement to FIG. 10.

In this alternative approach, illustrated in FIG. 11, either a secondary coating material is applied to the optical fibre which has a low Young's modulus (commercial secondary coatings in two layers are widely available, the inner secondary coating being in the region of 10 MPa) or an adhesive of very low Young's modulus is used; again the order of 10 MPa would be suitable.

With this arrangement, during the half cycle of the diaphragm's oscillation in which the diaphragm moves towards the coated optical fibre, the optical fibre is both radially deflected from its neutral position by the pressure exerted by the diaphragm, and strained by the combined forces of friction at the interface and the shear force from the adhesive. This results in efficient transfer of strain.

During the half cycle of the diaphragm's oscillation in which the diaphragm moves away from the coated optical fibre, the optical fibre will deform from its neutral (straight) position rather than experience compression. This results in highly inefficient transfer of strain.

There are a number of further techniques that can optionally be deployed in the arrangement of FIG. 11 (and in other embodiments of the invention) to maximise performance. These can be combined, or can be used individually:

Longitudinal reinforcement, in the form of fibres or a tape, can be used to increase the shear modulus of the adhesive. This is advantageous in increasing strain transfer efficiency in the half cycles where this is sought.

In the case of tape, this can be disposed at the sides (within the adhesive) or on the opposite side of the optical fibre to the diaphragm. In this later case, some adhesion improvement is also obtained due to the greater contact area with the coated optical fibre.

It is desirable to utilise adhesive with as high a shear modulus as is compatible with the requirement for a low Young's modulus for elastic behaviour. In general, where there are many half wavelengths in the interaction length, the requirement for high levels of differential performance between half cycles will prevail. Shear modulus and Young's modulus are similar for most materials. Consequently, the requirement of Young's modulus dominates and so adhesives at the lower end of the range of Young's modulus are preferred.

Where a direct (i.e. adhesive free) interface is utilised between the optical fibre and diaphragm, increasing the coefficient of friction between these surfaces is advantageous and can be achieved, for example, by one or more of:

High friction materials, for example secondary coatings with 'rubbery' characteristics.

The use of friction raising coatings on either or both surfaces.

The use of abrasion. The depth of the abrasions must be such that in the half cycle during which friction is not required to be engaged, the abrasions must not be effective. For a diaphragm with displacement at the required minimum displacement of 10 um, the depth of abrasion should not be greater than around 2 um.

Embodiments of the invention could be of significant value to designers, manufacturers and operators of Distributed Acoustic and/or Pressure Measuring Systems, as they produce optical sensing performance only possible up to now using complex wound fibre mandrels, but with the simplicity and efficiency of straight optical fibres.

The skilled person will appreciate that the systems and methods described above are examples embodying inventive concepts described herein and that many and various modifications can be made without departing from the invention.

REFERENCES

1. GB 1488253 of 19 Dec. 1974, Telecommunication system, DEN Davies and S A Kingsley
2. Optical Fibre Phase Modulator, Electronics Letters Vol 11 No 19, 18 Sep. 1975, S A Kingsley
3. Davies, D. E. N. and Kingsley, S. A., "Method of phase-modulating signals in optical fibres: application to optical-telemetry systems", Electronics Letters, 24 Jan. 1974, Vol. 10, No. 2, pp. 21-22
4. GB 2020419 of 5 May 1978, Signal sensors, S A Kingsley
5. Distributed Fiber-Optic Sensors, Proceedings of Ohmcon 84, Columbus Ohio June 1984
6. Journal of Physics, Applied Physics 37, 1 Sep. 2004, C Kirkendall and A. Dandridge
7. M. Phil Thesis of Stuart Kingsley, May 1975, University College London, Page 61 and Figure 4.5
8. Analysis of the acoustic response in water and sand of different fiber optic sensing cables, Brugg Cables Website 2016, Joachim Hofmann, Massimo Facchini, Mark Lowell, Brugg Cables—Fiber Optic Systems
9. Twenty-five years of interferometric fiber optic acoustic sensors at the Naval Research Laboratory, James H. Cole, Clay Kirkendall, Anthony Dandridge, Gary Cogdell, T. G Giallorenzi, Naval Research Laboratory Washington D.C, Fall 2004

The invention claimed is:

1. An apparatus for producing strain in at least one optical fibre proportional to dynamic pressure fluctuation in the surrounding substance, the apparatus comprising:
    a diaphragm having a first face that, in use, is exposed to dynamic pressure fluctuations in the substance, and a second, opposite face, the diaphragm being adapted to flex in response to dynamic pressure fluctuations applied to it; and
    at least one optical fibre mounted on either said first or said second face of the diaphragm, whereby strain is produced in the at least one fibre when the diaphragm flexes, wherein the length of the diaphragm is at least $1 \times 10^2$ times the width of the diaphragm and the at least one optical fibre extends longitudinally along the diaphragm and wherein the thickness of the diaphragm is in the range 0.5-50 mm.

2. An apparatus according to claim 1, wherein the length of the diaphragm is at least $10^3$ times the thickness of the diaphragm and the at least one optical fibre extends longitudinally along the diaphragm.

3. An apparatus according to claim 1, wherein the thickness of the diaphragm is no more than ½ the width of the diaphragm.

4. An apparatus according to claim 1, wherein the flexure of the diaphragm is oscillatory, the period of the oscillations being dependent on the frequency of the dynamic pressure fluctuation.

5. An apparatus according to claim 1 wherein the thickness, width and Young's modulus of the diaphragm are selected to maximise flexural displacement of the diaphragm for a given dynamic pressure measurand.

6. An apparatus according to claim 1 wherein the thickness and Young's modulus of the diaphragm are selected to maximise longitudinal strain of the second face of the diaphragm.

7. An apparatus according to claim 1 wherein the thickness of the diaphragm is in the range 0.5-4 mm.

8. An apparatus according to claim 1 wherein the width of the diaphragm is in the range 5-250 mm.

9. An apparatus according to claim 1 wherein the Young's Modulus of the diaphragm is in the range 0.1-2 GPa.

10. An apparatus according to claim 1, wherein the at least one optical fibre is mounted on the first or second face of the diaphragm by a fixture structure that is configured to result in more strain produced in the at least one optical fibre when the diaphragm flexes towards the at least one fibre compared to the strain produced in the optical fibre(s) when the diaphragm flexes away from the at least one optical fibre.

11. An apparatus according to claim 10, wherein the fixture structure comprises an elastic adhesive, having a Young's modulus lower than that of the diaphragm, arranged to bond the at least one optical fibre to the first or second face of the diaphragm, such that when the diaphragm flexes away from the at least one optical fibre the elasticity of the adhesive allows the second face of the diaphragm to move away from the at least one optical fibre.

12. An apparatus according to claim 11, wherein the Young's Modulus of the elastic adhesive is between 0.05 MPa and 10 MPa.

13. An apparatus according to claim 10, wherein the fixture structure comprises and adhesive and/or coating around the at least one optical fibre, between the fibre and the diaphragm, the adhesive and/or coating having a lower Young's modulus than the diaphragm, such that when the diaphragm flexes away from the at least one fibre the at least one fibre can deform within the adhesive and/or coating rather than be compressed.

14. An apparatus according to claim 13, wherein the Young's modulus of the adhesive and/or coating is between 0.05 MPa and 10 MPa.

15. An apparatus according to claim 10, further comprising longitudinal reinforcement, comprising at least one of fibres or a tape, disposed at sides of the at least one optical fibre or on an opposite side to the optical fibre to the diaphragm.

16. An apparatus according to claim 10, comprising a direct, adhesive free interface between the at least one optical fibre and the second face of the diaphragm, with one or more of the following characteristics to increase the coefficient of friction between the at least one optical fibre and the second face of the diaphragm:
high friction materials:
coatings with high friction coefficients:
abrasions in the second face of the diaphragm, the depth of the abrasions being having a height no more than 10% of the expected diaphragm displacement.

17. A method for producing strain in an optical fibre responsive to dynamic pressure fluctuation in a substance by using an apparatus in which the optical fibre is mounted on a diaphragm, wherein the length of the diaphragm is at least $1 \times 10^2$ times the width of the diaphragm and the optical fibre extends longitudinally along the diaphragm and wherein the thickness of the diaphragm is in the range 0.5-50 mm, and the diaphragm oscillates in response to dynamic pressure fluctuations in the substance, the optical fibre being mounted on the diaphragm such that as the diaphragm oscillates the strain in the fibre during one half cycle of the oscillation is higher than the strain in the fibre during the other half cycle of the oscillation.

18. A method according to claim 17, wherein during said one half cycle of the oscillation the diaphragm acts to place the optical fibre under tension and in said other half cycle the optical fibre can move relative to the diaphragm so as not to be compressed.

19. A method according to claim 17, wherein the substance is a fluid.

20. A method according to claim 17, wherein the substance is a solid.

* * * * *